United States Patent
Kariotoglou et al.

(10) Patent No.: US 12,290,943 B2
(45) Date of Patent: May 6, 2025

(54) ROBOTIC CAMERA SOFTWARE AND CONTROLLER

(71) Applicant: Seervision GMBH, Zürich (CH)

(72) Inventors: Nikolaos Kariotoglou, Zürich (CH); Reto Hofmann, Sutz (CH)

(73) Assignee: Seervision GmbH, Zürich (CH)

( * ) Notice: Subject to any disclaimer, the term of this patent is extended or adjusted under 35 U.S.C. 154(b) by 512 days.

(21) Appl. No.: 17/047,949

(22) PCT Filed: Apr. 16, 2019

(86) PCT No.: PCT/IB2019/053109
§ 371 (c)(1),
(2) Date: Oct. 15, 2020

(87) PCT Pub. No.: WO2019/202487
PCT Pub. Date: Oct. 24, 2019

(65) Prior Publication Data
US 2021/0362342 A1    Nov. 25, 2021

(30) Foreign Application Priority Data

Apr. 17, 2018 (CH) .................................... 0490/18

(51) Int. Cl.
*B25J 9/16* (2006.01)
*B25J 19/02* (2006.01)
(Continued)

(52) U.S. Cl.
CPC ........... *B25J 9/1697* (2013.01); *B25J 9/1664* (2013.01); *B25J 19/023* (2013.01); *G06N 3/08* (2013.01);
(Continued)

(58) Field of Classification Search
CPC ...... B25J 9/1697; B25J 9/1664; B25J 19/023; G06N 3/08; G06T 7/20; G06T 7/70; H04N 23/695
See application file for complete search history.

(56) References Cited

U.S. PATENT DOCUMENTS

| 8,542,383 B2 | 9/2013 | Komiyama et al. |
| 2014/0232818 A1* | 8/2014 | Carr ............... H04N 5/2224 348/36 |

(Continued)

FOREIGN PATENT DOCUMENTS

| JP | 2007/158860 A | 6/2007 |
| JP | 2012/114593 A | 6/2012 |
| JP | 5119823 B2 | 1/2013 |

OTHER PUBLICATIONS

International Search Report & Written Opinion for PCT/IB2019/053109, dated Jul. 29, 2019, 9 pages.

*Primary Examiner* — Basil T. Jos
(74) *Attorney, Agent, or Firm* — Blank Rome LLP

(57) ABSTRACT

A robotic camera system comprising: a robot head (45), for carrying and orienting a camera (48), a video capture unit (30), operatively arranged to capture video and/audio recording from the camera and storing in a frame buffer area (260), a processor unit (40), having access to the frame buffer area (260) and operatively arranged for generating a reference camera trajectory (130) based on directives from a director, optimizing (140) said camera trajectory based on a real-time projection of objects of interest in the video recording in the frame buffer area (260), driving the robot head (45) to follow the optimized trajectory.

18 Claims, 2 Drawing Sheets

(51) Int. Cl.
*G06N 3/08* (2023.01)
*G06T 7/20* (2017.01)
*G06T 7/70* (2017.01)
*H04N 23/695* (2023.01)

(52) U.S. Cl.
CPC ............... *G06T 7/20* (2013.01); *G06T 7/70* (2017.01); *H04N 23/695* (2023.01)

(56) References Cited

U.S. PATENT DOCUMENTS

| | | | |
|---|---|---|---|
| 2017/0006209 A1* | 1/2017 | Boca | H04N 23/66 |
| 2019/0149771 A1* | 5/2019 | Oami | G06T 7/292 |
| | | | 348/143 |
| 2019/0213481 A1* | 7/2019 | Godard | G06N 3/047 |
| 2022/0343138 A1* | 10/2022 | Tang | H04N 23/695 |

* cited by examiner

ROBOTIC CAMERA SOFTWARE AND CONTROLLER

RELATED APPLICATIONS

This application is a national phase of PCT/IB2019/053109, filed Apr. 16, 2019, which claims the benefit of Swiss Patent Application No. 0490/18, filed on Apr. 17, 2018. The entire contents of those applications are hereby incorporated by reference.

FIELD OF THE INVENTION

The present invention concerns a system for filming automatically moving objects with robotized cameras.

DESCRIPTION OF RELATED ART

Algorithms designed to automatically film moving objects using cameras attached to robotic equipment struggle to achieve the same performance of human operators in dynamically changing scenes. The main visible problems are:
a) "Robotic" movement of cameras,
b) Unnecessary movements
c) Too slow reaction to a scene
d) No adaptation to things that are obvious to humans
e) Audible movement of robot parts picked up by camera microphones

BRIEF SUMMARY OF THE INVENTION

According to the invention, these aims are achieved by the system herein described and claimed.

In particular, the invention arises from an analysis of the limitations of the known solutions that are identified in:

Lack of understanding of what is going on from a video production perspective: e.g. there are no systems that can work with any camera and lens via external actuation capable to react correctly to different situations like a person is lingering on a stage vs a tennis player accelerates to reach the net.

Lack of prediction of robot movements based on the understanding: e.g. if a sport car is coming towards a camera placed on the side of a turn, a human predicts the next position by knowing the race track and the position of the camera on it. Existing robots lack the intelligence to put an object they track into the context of an unknown environment and based on that predict how they need to position the camera to get the best cinematographic result. Similarly, when a tennis player runs towards the net for a volley, a human cameraman knows that he will stop before dropping on the net, and adjust camera movements accordingly, while robots cannot do that unless the action hardcoded by the operators. The invention takes care of such things by the scene aware predictions.

Cases where a human operator would not re-frame the shot. E.g. when a speaker on a stage oscillates around a fixed point, a robot should recognize this and adjust the framing (zoom, reposition) such that there is no need to move the camera all the time. Importantly, the system of the invention can recognize such situations in different contexts without specific "reprogramming" like a human.

"Robotic" movements are due to sudden acceleration. These happen because all existing controllers react based on fixed thresholds such as e.g. "If a person is out of a certain area, move the camera to bring them back. As soon as he/she is in, stop". This is not how a human works because a human will expect the movement and prepare the frame in a way to avoid sudden movements. Experienced operators can foresee the movements of the subjects and execute a frame that captures their motions requiring the least amount of movement. This relates to point discussed above but its additionally requires predicting how to position future frames and not the current one.

Lack of forward looking predictions for framing fast objects. Humans use spontaneously physical models of motion to predict where their targets move in space. E.g. A human can easily film a flying rocket despite the speed, because he can predict the trajectory by unconscious physical modelling. Current systems lack the ability to recognize the situation, attribute it to a physical model and predictively follow their targets.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
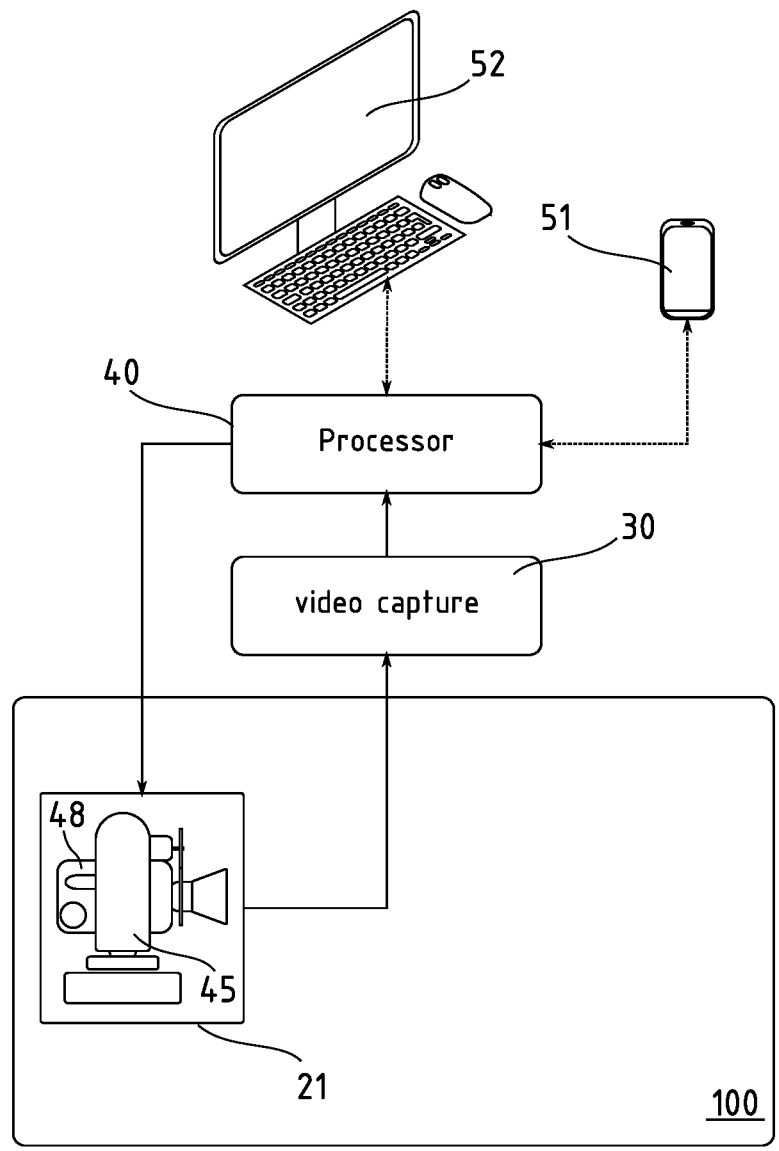
FIG. 1 shows a simplified diagram of a robotized filming system

FIG. 1 represents in simplified fashion a robotized filming system suitable for embodying the invention. The scene 100 is a predetermined area in which an action is performed that the system must capture. The invention can involve any number of robotized cameras 21 that capture the action in video and/or audio, although only one is illustrated. The cameras 21 are typically mounted on automatic motorized gimbals that are capable of panning, rolling, and tilting the camera under the control of an electronic processor 40. The invention may include both fixed cameras that are installed on a stationary tripod and movable camera that are carried by some sort of autonomous vehicle or aircraft, also controlled by the processor 40. The system controls the x, y, z, positions and the three components of velocity of each camera.

Preferably and importantly, the setting of camera's optics like the focus distance, focal length (which determines the angle of view) iris aperture, and so on are automatically settable and managed by the processor 40.

The present description refers to "a processor" for simplicity's sake but this should not be construed to indicate that the invention is limited to a single-processor implementation. The wording "processor" explicitly includes, in this context, any assembly of computing device capable of processing data and may be realized by a plurality of physically distinct devices communicating between them in a network or through a communication bus. The invention is not limited to serially-programmable processors either, and includes all possible system capable of processing digital data including wired logic circuits and Field-programmable logic circuits. Artificial neural networks, insofar as they are included in the invention, may be implemented in software or in hardware, for example by FPGAs or dedicated hardware.

In a preferred implementation, the processor unit comprises at least one general-purpose CPU, for example an Intel processor or a compatible unit, and a dedicated GPU for high efficiency visual processing, for example an NVIDIA GPU.

The video stream generated by the cameras 21 is transmitted to a dedicate video capture unit 30, also named frame extractor that has the function of storing the video frames into a working memory of the processor unit. The frames are preferably stored in a rolling buffer to maintain an history that is used for modelling and predicting, as it will be explained later.

Multiple interface units can be foreseen to allow an interaction with the system of the invention, for example a personal computer 52, or a mobile terminal 51 like a smartphone or a tablet. The communication between the interface units and the processor unit 40 may be implemented by a wired bus (e.g. USB), a wireless link, including Bluetooth® or Wi-Fi. The communication may follow a standard network protocol, for example https on TCP/IP. The latter implementation also opens the possibility of remote connections through a LAN or WAN.

The processor unit 40 and the frame capture unit 30 are drawn as separate unit detached from the camera head 45 to underline their specific independent function. In concrete implementations, however, they might be embedded fully or in part in the robotic head. Some computation-intensive and not time-critical functions of the camera system may be delegated to external servers.

Figure 2:
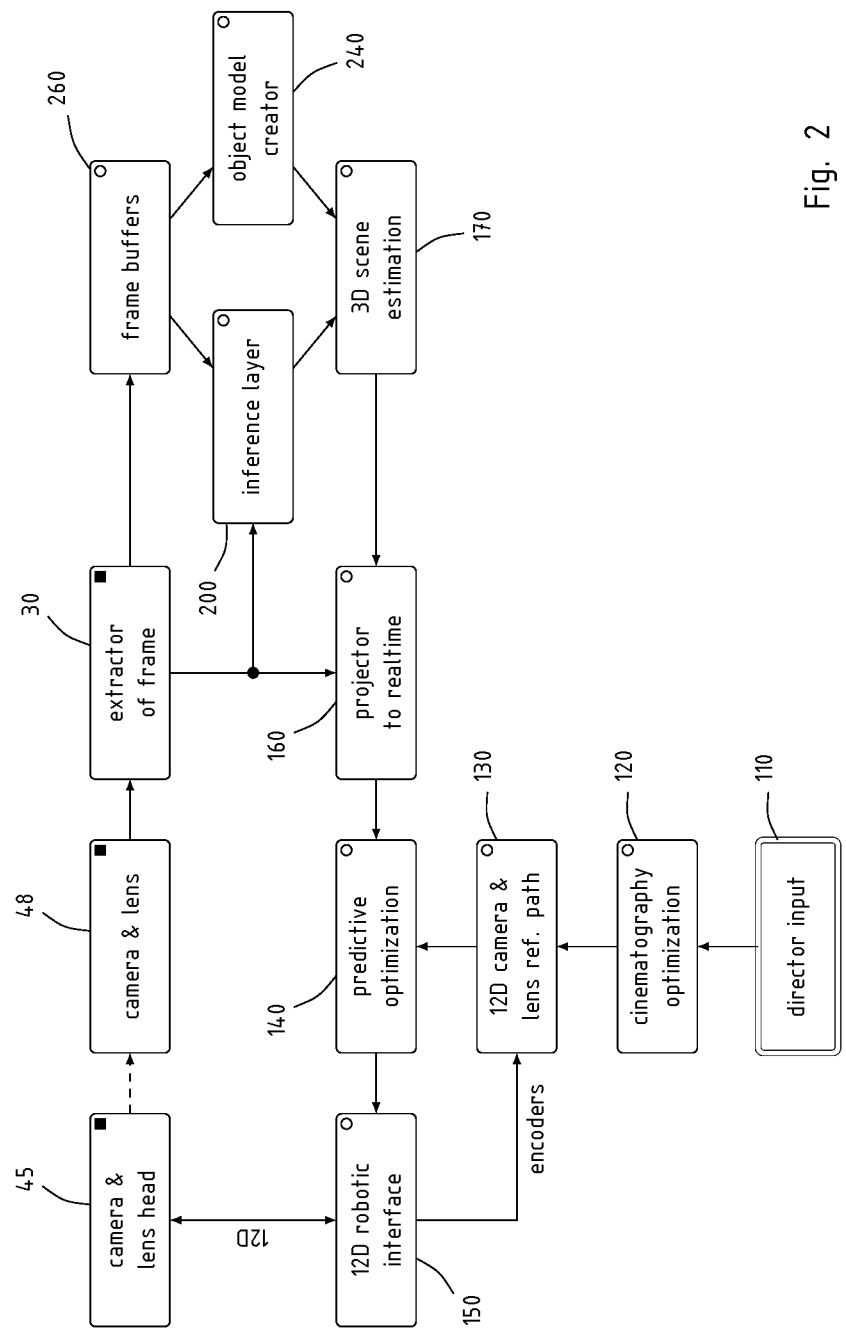
FIG. 2 is a block diagram illustrating the interaction of the various hardware and software elements of the invention.

FIG. 2 illustrates schematically the hardware and software combination that enables the invention to achieve automatic and human-like camera movements, silently and compatibly to any camera and lens. The blocks designated by full squares are hardware devices, while the blocks marked by empty circles stand for data processing functions or data structures, possibly implemented in software by the processor 40. The arrows indicate the preferred or principal flow of the information, or also that a block causes an alteration in the state of another one. Other connections, influences, and exchange of signals on different paths and in the opposite direction are not excluded, however.

The basic dimensionality of the system is at least twelve, including the x, y, z position coordinates, pan, tilt, roll angles, at least three components of velocity, zoom, focus, and iris (aperture) of the camera. The system can deal with a higher number of dimensions. The exchange of information and commands between the robot interface 150 and the camera heads 45 involves the control of 12 axes.

A frame coming from the live output of the camera 48 is generated by the capture of an image through the camera lens, with the unavoidable or deliberate distortions of the image-forming process. The frame-extractor unit 30 receives the frame and stores it in an area of memory denoted 'frame buffers' 260, that can be accessed by the processor 40. The frame buffers 260 are structured as a rolling buffer that retains an history of past frames back to a predetermined depth. The inference unit 200 and the object modeler unit 240 process this historical segment of frames rather than one static frame after another.

The inference unit 200 is operatively arranged to detect and identify objects in the scene together with their contours. This may be realized by any suitable object identification method capable of determining what objects are present in each frame and where they are in the frame. This includes artificial neural networks, for example. A three-deep convolutional neural network has been tested and used with good effect.

The frames in buffer 260 are also passed to the object modeler unit 240 that independently builds a movement model for objects that are not just in the most recent frame, but also in the precedent ones. This is currently implemented as a linear system abstraction for all objects, imitating the movement of a so-called double integrator but could be a particle filter of neural network movement model creator, or any other suitable algorithm.

The inference layer output and the object model creator output are passed to the 3D scene estimation unit 170 that build an estimate of the scene currently in front of the camera, expressed in 3D world coordinates. (dimensions can be many more, including velocities etc.).

The update of the scene estimation unit 170 is used by a projector unit 160 that updates the state of objects of interest in real-time, based also on the original material from the frame extractor 30 r, equivalently, on the most recent frames in the frame buffer 260. Preferably the projector unit 160 updates the states of the targeted objects without missing any frame grabbed from the camera. This block uses preferably simple and time-efficient algorithms, for example a linear interpolation model. This can be based on the brightness of pixels in the image (the so-called optical flow algorithms).

The predictive optimization unit operates on two inputs: the states of the objects provided by the projector unit 160, and a reference path generated from a director input 110.

The director input directives 110 are expressed in term of objects of interest and of their target positions. It is processed by an algorithm that creates a static goal of how the 2D image that a spectator will see on screen should look like, respecting the directives. The directives may indicate, for example that the frame should include a person, the person to whom another person is speaking to, and/or an object that the speaker is looking at, and change with the speaker's gaze. The cinematographic optimization unit 120 implements also constraints that guarantee that the result will satisfy the director's requirements. This optimization algorithm is implemented by integrating a set of known cinematography rules and neural networks trained on past footage, for example.

The camera and lens path generator 130 uses the static frame goal given by the cinematography optimization unit 120 and designs a feasible path that the robotic system can follow to reach the required static goal frame. Importantly, the path generator 130 has access to the encoders of the camera and lens head, that yield an exact position of the camera and a precise knowledge of the lens setting. Encoder data may pass through the robotic interface 150 as a proxy, as drawn, or be accessible in any other way. The path generator makes full use of the optical characteristics of the camera and lens that are identified in a prior calibration and setup process.

The predictive optimization unit fusions the states of the objects provided by the projector unit 160, and the reference path generated from a director input 110 to create a goal position of the camera adjusted to the predicted movement of the scene. The optimization unit 140 takes care of a long constraints related to the capabilities of the robotic system and the camera & lens apparatus that are identified in the setup phase. For example, the optimization unit takes care that movement exceeding the speed limits of the robotic system.

Advantageously, the system of the invention can adapt to any type of object, for example a person, a car, or any object that can be recognized and positioned by the inference layer 200. The predictions of the projector are fast and their availability is deterministic, no matter what the object of interest, because the projector is designed to work in real time on all the grabbed frames. This allows a refresh frequency of the predictive algorithm, at the output of unit 160 of 100 Hz or better. The optimized trajectories generated by the optimization unit 140 are the result of a constrained optimization algorithm and are guaranteed never to exceed the specification of the robotic head.

The system understands directives given in term of objects and their relationships. These can be given in real time without reprogramming, providing in this way great artistic freedom and natural results.

The invention claimed is:

1. A robotic camera system comprising:
a robot head that carries and orients a camera;
a video capture unit that captures a video recording from the camera and stores the video recording in a frame buffer area;
an inference layer that detects objects within the video recording; and
a processor unit having access to the frame buffer area, the processor unit performing the following operations:
generating a reference camera path of the detected objects based on directives, the directives specify target positions of the detected objects in a frame of the video recording constraining the reference camera path in order to satisfy the directives;
optimizing said camera path based on a real-time projection of the detected objects in the video recording; and
driving the robot head of the camera to follow the optimized camera path.

2. The robotic camera system of claim 1, wherein the robot head is operable to move, orient, or set the camera in at least some of: space coordinates (x, y, z); pan angle, tilt angle, roll angle, focus, angle of view, diaphragm.

3. The robotic camera system of claim 1, comprising a robotic interface arranged for controlling the camera head in position and speed.

4. The robotic camera system of claim 1, comprising a projector unit that generates said real-time projection by an optical flow algorithm.

5. The robotic camera system of claim 1, the inference layer including a convolutional neural network.

6. The robotic camera system of claim 1, including an object modeler unit that builds a movement model for objects of interest captured in the frame buffer based on a time series of frames.

7. A method of directing a camera along an optimized camera path comprising:
capturing and storing a video recording from the camera,
detecting objects within the video recording,
generating a reference camera path of the detected objects based on directives, the directives specify target positions of the detected objects in a frame of the video recording constraining the reference camera path to satisfy the directives,
optimizing said camera path based on a real-time projection of the detected objects in the video recording, and
driving a robot head carrying and orienting the camera to follow the optimized camera path.

8. The method of claim 7, wherein said real-time projection is generated by an optical flow algorithm.

9. The method of claim 7, wherein the detection of object is performed by a convolutional neural network.

10. The method of claim 7, further comprising:
building a movement model for objects of interest based on a time series of frames in the captured video recording,
passing the movement model to a 3D scene estimation unit that builds an estimate of a scene currently in front of the camera expressed in 3D world coordinates and
passing the estimate of the scene to the projection unit that builds the real-time projection of the detected objects.

11. The method of claim 7, wherein the optimized camera path comprises moving, orienting or setting the camera in at least some of: space coordinates (x, y, z), pan angle, tilt angle, roll angle, focus, angle of view, diaphragm.

12. The method of claim 7, comprising a step of controlling the position and the speed of the robotic head.

13. A non-transitory computer program product comprising a computer usable medium having recorded therein a program executable by a computer to perform method steps for directing a camera along an optimized camera path, the method steps comprising:
capturing and storing a video recording from the camera,
detecting objects within the video recording,
generating a reference camera path of the detected objects based on directives, the directives specify target positions of the detected objects in a frame of the video recording constraining the reference camera path to satisfy the directives,
optimizing said camera path based on a real-time projection of the detected objects in the video recording, and
driving a robot head carrying and orienting the camera to follow the optimized camera path.

14. The non-transitory computer program product of claim 13,
wherein said real-time projection is generated by an optical flow algorithm.

15. The non-transitory computer program product of claim 13,
wherein the detection of object is performed by a convolutional neural network.

16. The non-transitory computer program product of claim 13, further comprising:
building a movement model for objects of interest based on a time series of frames in the captured video recording,
passing the movement model to a 3D scene estimation unit that builds an estimate of a scene currently in front of the camera expressed in 3D world coordinates and
passing the estimate of the scene to the projection unit that builds the real-time projection of the detected objects.

17. The non-transitory computer program product of claim 13, wherein the optimized camera path comprises moving, orienting or setting the camera in at least some of: space coordinates (x, y, z), pan angle, tilt angle, roll angle, focus, angle of view, diaphragm.

18. The non-transitory computer program product of claim 13, comprising a step of controlling the position and the speed of the robotic head.

* * * * *